(12) United States Patent
Krizan

(10) Patent No.: US 7,858,687 B2
(45) Date of Patent: Dec. 28, 2010

(54) POLYIMIDE RESINS FOR HIGH TEMPERATURE WEAR APPLICATIONS

(75) Inventor: Timothy D. Krizan, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 12/182,571

(22) Filed: Jul. 30, 2008

(65) Prior Publication Data

US 2010/0029826 A1 Feb. 4, 2010

(51) Int. Cl.
C08K 3/34 (2006.01)
(52) U.S. Cl. .................................... 524/447; 524/456
(58) Field of Classification Search ............... 524/447, 524/456
See application file for complete search history.

(56) References Cited

U.S. PATENT DOCUMENTS

| | | | |
|---|---|---|---|
| 4,360,626 | A | 11/1982 | Manwiller |
| 4,898,905 | A | 2/1990 | Kawakami et al. |
| 5,258,441 | A * | 11/1993 | Nagahiro et al. ............ 524/425 |
| 5,688,848 | A | 11/1997 | Cella |
| 5,789,523 | A | 8/1998 | George |
| 5,886,129 | A | 3/1999 | DeColibus |
| 5,888,645 | A | 3/1999 | Lindgaard |
| 6,501,934 | B1 | 12/2002 | Ahuja et al. |
| 6,713,597 | B2 | 3/2004 | Lindway |
| 7,192,651 | B2 | 3/2007 | Ohno |
| 2002/0111415 | A1 | 8/2002 | Mack |
| 2004/0030004 | A1 | 2/2004 | Horacek |
| 2005/0096234 | A1 | 5/2005 | Mack |
| 2006/0084742 | A1 | 4/2006 | Ishida |
| 2006/0128866 | A1 | 6/2006 | Diakoumakos |
| 2006/0167139 | A1 | 7/2006 | Nelson |
| 2007/0160856 | A1 | 7/2007 | Krizan et al. |
| 2010/0029825 | A1 | 2/2010 | Burch et al. |

FOREIGN PATENT DOCUMENTS

| | | |
|---|---|---|
| CN | 177281 | 5/2006 |
| EP | 0170299 B1 | 1/1990 |
| EP | 0454222 B1 | 1/1996 |
| JP | 59096142 A | 6/1984 |
| JP | 62132960 A | 6/1987 |
| JP | 5008238 A | 1/1993 |
| JP | 2724622 B2 | 3/1998 |
| JP | 2000164403 A | 6/2000 |
| JP | 2003156902 A | 5/2003 |
| JP | 2003192893 A | 7/2003 |
| WO | 9703116 | 1/1997 |

OTHER PUBLICATIONS

Murray, Traditional and New Applications for Kaolin, Smectite, and Palygorskite: A General Overview, Applied Clay Science, 2000, vol. 17:207-221.
Bokobza et al., Fibre Reinforcement of Elastomers, 2004, Society of Chem Industry, Poly Mint, vol. 53, pp. 1060-1065.
Brunauer et al., Adsorption of Gases in Multimolecular Layers, 1938, vol. 60, Bureau of Chemistry and Soils and George Washington University.
Sazanov, Relay Stabilization of Polyimides, 2002, Russian Journal of Applied Chemistry, vol. 75, pp. 98-101.
Lai et al., An Investigation of Friction and Wear Behaviors of Polyimide/Attapulgite Hybrid Materials, 2005, vol. 290, Macromol Mater Eng., pp. 195-201.
Lai et al., The Effect of Silica Size on the Friction and Wear Behaviors of Polyimide/Silica Hybrids by Sol-Gel Processing, 2007, vol. 262, Wear, pp. 1048-1055.
International Search Report, dated Oct. 14, 2009, PCT/US2009/052088.
International Search Report, dated Feb. 11, 2009, PCT/US2009/052060.

* cited by examiner

*Primary Examiner*—Robert D. Harlan

(57) ABSTRACT

Polyimide resin compositions that contain an aromatic polyimide, graphite and a kaolin filler, are found to exhibit low wear and high thermal oxidative stability. Such compositions are especially useful in molded articles that are exposed to wear conditions at high temperatures such as aircraft engine parts.

20 Claims, 3 Drawing Sheets

POLYIMIDE RESINS FOR HIGH TEMPERATURE WEAR APPLICATIONS

TECHNICAL FIELD

This disclosure relates to filled polyimide resin compositions that are useful for high temperature wear applications such as aircraft engine parts.

BACKGROUND

The unique performance of polyimide compositions under stress and at high temperatures have made them useful in applications requiring high wear resistance, particularly at conditions of high pressure and velocity. Some examples of such applications are aircraft engine parts, aircraft wear pads, automatic transmission bushings and seal rings, tenter frame pads and bushings, material processing equipment parts, and pump bushings and seals.

Typically, a polyimide component in applications as described above is intended to function as a sacrificial, or consumable, component, thereby preventing or reducing the wear or damage that a more costly mating or adjacent component would experience if it were mated against some other component. However, as the polyimide component wears, the resulting increased clearances can result in other adverse effects, such as increased leakage (of air pressure or fluid) or increased noise, thereby reducing the operating effectiveness of the entire system in which the polyimide component is contained. Restoring the system to its original operating effectiveness would require replacement of the worn polyimide component with a new unused polyimide component. Replacement may require disassembly, reassembly, testing and re-calibration ("service") of the system, resulting in considerable costs in terms of down-time and labor. Thus, a polyimide component that demonstrates a lower rate of wear is desirable to reduce the frequency of replacement and service, thereby reducing cost.

Despite the variety of polyimide compositions, and additives for those compositions such as graphite, that have previously been available, a need still remains for polyimide compositions that exhibit as molded parts the desirably high degree of wear resistance at high temperatures required for applications such aircraft engine parts, while maintaining the other advantageous attributes of the polyimide material.

SUMMARY

In one embodiment, this invention provides composition that includes an aromatic polyimide, graphite and a kaolin filler.

In another embodiment, this invention provides a composition that includes (a) an aromatic polyimide in an amount of about 30 weight parts or more and yet in an amount of about 55 weight parts or less; (b) graphite in an amount of about 45 weight parts or more and yet in an amount of about 70 weight parts or less; and (c) a kaolin filler in an amount of about 0.1 weight parts or more and yet in an amount of about 5.0 weight parts or less; where all weight parts combined together total to 100 weight parts.

Yet another embodiment of the invention hereof is a composition of matter substantially as shown or described in any one or more of FIGS. 1~3.

Articles fabricated from the above described compositions are also provided.

BRIEF DESCRIPTION OF THE DRAWINGS

Various features and/or embodiments of this invention are illustrated in drawings as described below.

These features and/or embodiments are representative only, and the selection of these features and/or embodiments for inclusion in the drawings should not be interpreted as an indication that subject matter not included in the drawings is not suitable for practicing the invention, or that subject matter not included in the drawings is excluded from the scope of the appended claims and equivalents thereof.

DETAILED DESCRIPTION

Figure 1:
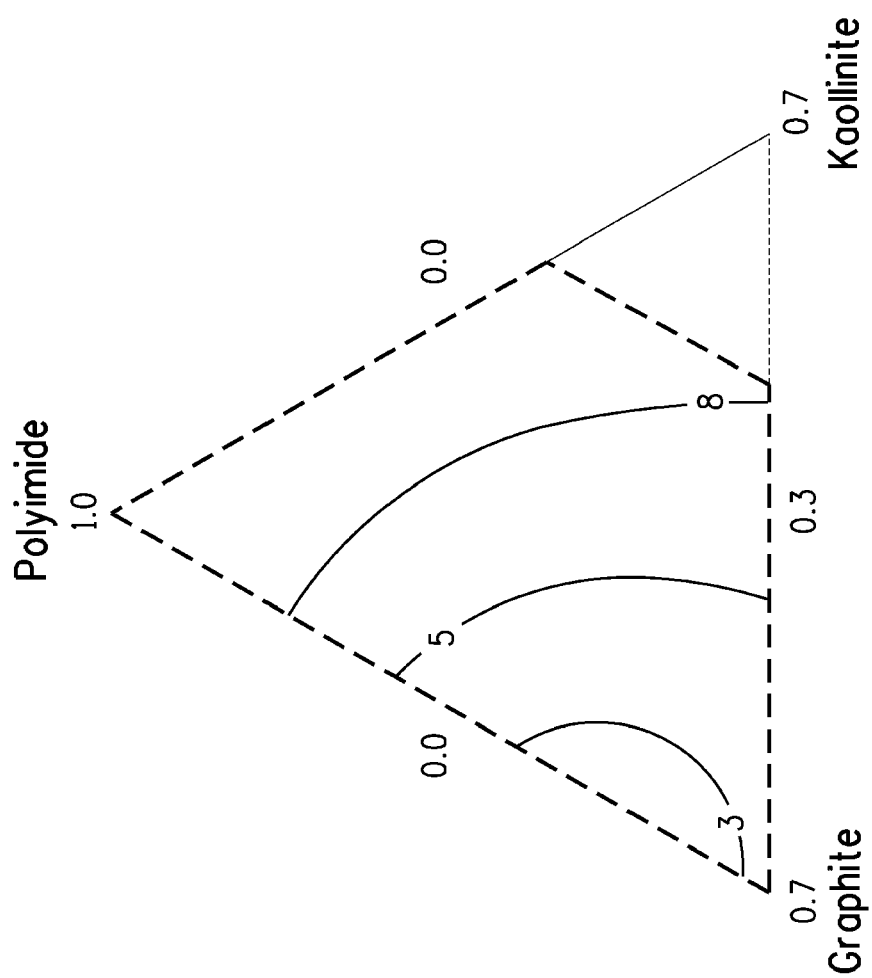
FIG. 1 is a response surface plot of the thermal oxidative stability model derived in the examples.

Disclosed herein are compositions that contain (a) an aromatic polyimide, (b) graphite, and (c) a kaolin filler.

A polyimide as used as the component "(a)" in a composition hereof is polymer in which at least about 80%, preferably at least about 90%, and more preferably essentially all (e.g. at least about 98%) of the linking groups between repeat units are imide groups. An aromatic polyimide as used herein includes an organic polymer in which about 60 to about 100 mol %, preferably about 70 mol % or more, and more preferably about 80 mol % or more of the repeating units of the polymer chain thereof have a structure as represented by the following Formula (I):

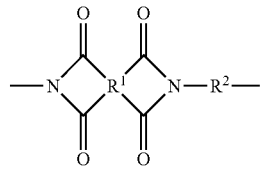

wherein $R^1$ is a tetravalent aromatic radical and $R^2$ is a divalent aromatic radical, as described below.

A polyimide polymer suitable for use herein may be synthesized, for example, by reacting a monomeric aromatic diamine compound (which includes derivatives thereof) with a monomeric aromatic tetracarboxylic acid compound (which includes derivatives thereof), and the tetracarboxylic acid compound can thus be the tetracarboxylic acid itself, the corresponding dianhydride, or a derivative of the tetracarboxylic acid such as a diester diacid or a diester diacidchloride. The reaction of the aromatic diamine compound with an aromatic tetracarboxylic acid compound produces the corresponding polyamic acid ("PAA"), amic ester, amic acid ester, or other reaction product according to the selection of starting materials. An aromatic diamine is typically polymerized with a dianhydride in preference to a tetracarboxylic acid, and in such a reaction a catalyst is frequently used in addition to a solvent. A nitrogen-containing base, phenol or an amphoteric material can be used as such a catalyst.

A polyamic acid, as a precursor to a polyimide, can be obtained by polymerizing an aromatic diamine compound and an aromatic tetracarboxylic acid compound, preferably in substantially equimolar amounts, in an organic polar solvent that is generally a high-boiling solvent such as pyridine, N-methylpyrrolidone, dimethylacetamide, dimethylformamide or mixtures thereof. The amount of all monomers in the solvent can be in the range of about 5 to about 40 wt %, in the range of about 6 to about 35 wt %, or in the range of about 8 to about 30 wt %, based on the combined weight or monomers and solvent. The temperature for the reaction is generally not higher than about 100° C., and may be in the range of about 10° C. to 80° C. The time for the polymerization reaction generally is in the range of about 0.2 to 60 hours.

Imidization to produce the polyimide, i.e. ring closure in the polyamic acid, can then be effected through thermal treatment, chemical dehydration or both, followed by the elimination of a condensate (typically, water or alcohol). For example, ring closure can be effected by a cyclization agent such as pyridine and acetic anhydride, picoline and acetic anhydride, 2,6-lutidine and acetic anhydride, or the like.

In various embodiments of the thus-obtained polyimide, about 60 to 100 mole percent, preferably about 70 mole percent or more, more preferably about 80 mole percent or more, of the repeating units of the polymer chain thereof have a polyimide structure as represented by the following Formula (I):

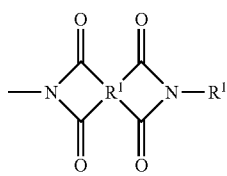

I wherein $R^1$ is a tetravalent aromatic radical derived from the tetracarboxylic acid compound; and $R^2$ is a divalent aromatic radical derived from the diamine compound, which may typically be represented as $H_2N—R^2—NH_2$.

A diamine compound as used to prepare a polyimide for a composition hereof may be one or more of the aromatic diamines that can be represented by the structure $H_2N—R^2—NH_2$, wherein $R^2$ is a divalent aromatic radical containing up to 16 carbon atoms and, optionally, containing one or more (but typically only one) heteroatoms in the aromatic ring, a heteroatom being, for example, selected from —N—, —O—, or —S—. Also included herein are those $R^2$ groups wherein $R^2$ is a biphenylene group. Examples of aromatic diamines suitable for use to make a polyimide for a composition hereof include without limitation 2,6-diaminopyridine, 3,5-diaminopyridine, 1,2-diaminobenzene, 1,3-diaminobenzene (also known as m-phenylenediamine or "MPD"), 1,4-diaminobenzene (also known as p-phenylenediamine or "PPD"), 2,6-diaminotoluene, 2,4-diaminotoluene, and benzidines such as benzidine and 3,3'-dimethylbenzidine. The aromatic diamines can be employed singly or in combination. In one embodiment, the aromatic diamine compound is 1,4-diaminobenzene (also known as p-phenylenediamine or "PPD"), 1,3-diaminobenzene (also known as m-phenylenediamine or "MPD"), or mixtures thereof.

Aromatic tetracarboxylic acid compounds suitable for use to prepare a polyimide for a composition hereof may include without limitation aromatic tetracarboxylic acids, acid anhydrides thereof, salts thereof and esters thereof. An aromatic tetracarboxylic acid compound may be as represented by the general Formula (II):

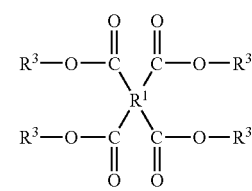

II wherein $R^1$ is a tetravalent aromatic group and each $R^3$ is independently hydrogen or a lower alkyl (e.g. a normal or branched $C_1$~$C_{10}$, $C_1$~$C_8$, $C_1$~$C_6$ or $C_1$~$C_4$) group. In various embodiments, the alkyl group is a $C_1$ to $C_3$ alkyl group. In various embodiments, the tetravalent organic group $R^1$ may have a structure as represented by one of the following formulae:

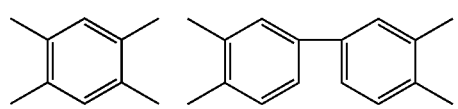

Examples of suitable aromatic tetracarboxylic acids include without limitation 3,3',4,4'-biphenyltetracarboxylic acid, 2,3,3',4'-biphenyltetracarboxylic acid, pyromellitic acid, and 3,3',4,4'-benzophenonetetracarboxylic acid. The aromatic tetracarboxylic acids can be employed singly or in combination. In one embodiment, the aromatic tetracarboxylic acid compound is an aromatic tetracarboxylic dianhydride, particularly 3,3',4,4'-biphenyltetracarboxylic dianhydride ("BPDA"), pyromellitic dianhydride ("PMDA"), 3,3,4,4'-benzophenonetetracarboxylic dianhydride, or mixtures thereof.

In one embodiment of a composition hereof, a suitable polyimide polymer may be prepared from 3,3',4,4'-biphenyltetracarboxylic dianhydride ("BPDA") as the aromatic tetracarboxylic acid compound, and from greater than 60 to about 85 mol % p-phenylenediamine ("PPD") and 15 to less than 40 mol % m-phenylenediamine ("MPD") as the aromatic diamine compound. Such a polyimide is described in U.S. Pat. No. 5,886,129 (which is by this reference incorporated as a part hereof for all purposes), and the repeat unit of such a polyimide may also be represented by the structure shown generally in the following Formula (III):

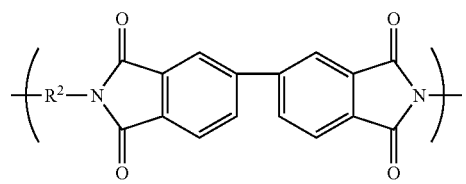

III wherein greater than 60 to about 85 mol % of the $R^2$ groups are p-phenylene radicals:

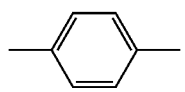

and 15 to less than 40 mol % are m-phenylene radicals:

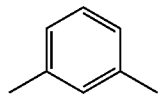

In an alternative embodiment, a suitable polyimide polymer may be prepared from 3,3',4,4'-biphenyltetracarboxylic dianhydride ("BPDA") as a dianhydride derivative of the tetracarboxylic acid compound, and 70 mol % p-phenylenediamine and 30 mol % m-phenylenediamine as the diamine compound.

A polyimide as used herein is preferably a rigid polymer. A polyimide polymer is considered rigid when there are no, or an insignificant amount (e.g. less than 10 mol %, less than 5 mol %, less than 1 mol % or less than 0.5 mol %) of, flexible linkages in the polyimide repeating unit. Flexible linkages are moieties that are predominantly composed of a small number of atoms, and that have an uncomplicated structure (such as straight-chain rather than branched or cyclic), and thus permit the polymer chain to bend or twist with relative ease at the location of the linkage. Examples of flexible linkages include without limitation: —O—, —N(H)—C(O)—, —S—, —SO$_2$—, —C(O)—, —C(O)—O—, —C(CH$_3$)$_2$—, —C(CF$_3$)$_2$—, —(CH$_2$)—, and —NH(CH$_3$)—. Although disfavored, these or other flexible linkages, when present, are sometimes found in the R portion of an aromatic diamine compound.

A polyimide as used herein is preferably an infusible polymer, which is a polymer that does not melt (i.e. liquefy or flow) below the temperature at which it decomposes. Typically, parts prepared from a composition of an infusible polyimide are formed under heat and pressure, much like powdered metals are formed into parts (as described, for example, in U.S. Pat. No. 4,360,626, which is by this reference incorporated as a part hereof for all purposes).

A polyimide as used herein preferably has a high degree of stability to thermal oxidation. At elevated temperature, the polymer will thus typically not undergo combustion through reaction with an oxidant such as air, but will instead vaporize in a thermolysis reaction.

Graphite is used as the component "(b)" of a composition hereof. Graphite is typically added to a polyimide composition to improve wear and frictional characteristics, and to control the coefficient of thermal expansion (CTE). The amount of graphite used in a polyimide composition for such purpose is thus sometimes advantageously chosen to match the CTE of the mating components.

Graphite is commercially available in a variety of forms as a fine powder, and may have a widely varying average particle size that is, however, frequently in the range of from about 5 to about 75 microns. In one embodiment, the average particle size is in the range of from about 5 to about 25 microns. In another embodiment, graphite as used herein contains less than about 0.15 weight percent of reactive impurities, such as those selected from the group consisting of ferric sulfide, barium sulfide, calcium sulfide, copper sulfide, barium oxide, calcium oxide, and copper oxide.

Graphite as suitable for use herein can be either naturally occurring graphite or synthetic graphite. Natural graphite generally has a wide range of impurity concentrations, while synthetically produced graphite is commercially available having low concentrations of reactive impurities. Graphite containing an unacceptably high concentration of impurities can be purified by any of a variety of known treatments including, for example, chemical treatment with a mineral acid. Treatment of impure graphite with sulfuric, nitric or hydrochloric acid, for example, at elevated or reflux temperatures can be used to reduce impurities to a desired level.

A kaolin filler is used as the component "(c)" of a composition hereof. A kaolin filler suitable for use herein includes kaolinite itself, which is a sheet-type silicate whose molecules are arranged in two sheets or plates, one of silica and one of alumina. Kaolinite is a clay mineral with the chemical composition $Al_2Si_2O_5(OH)_4$. It is a layered silicate mineral, with one tetrahedral sheet linked through oxygen atoms to one octahedral sheet of alumina octahedra. Rocks that are rich in kaolinite are known as china clay or kaolin. In contrast, smectites such as montmorillonite clay minerals are arranged in two silica sheets and one alumina sheet. The molecules of the smectites are less firmly linked together than those of the kaolinite group and are thus further apart. Maintaining the phase stability of crystal structure of the sheet silicates is desirable, as is maintaining the thermal stability of the structural water of the sheet silicates at higher temperatures, such as up to about 450° C. [as shown, for example, by thermogravimetric analysis (TGA)]. Loss of structural water during processing of a polyimide composition can result in harm to polyimide integrity, and possibly change the crystal structure of the sheet silicate, giving a harder, more abrasive compound. Examples of sheet silicates that are not stable enough to be included in the compositions described herein are montmorillonite, vermiculite, and pyrophillite.

Kaolin fillers suitable for use herein are discussed further in Murray, Applied Clay Science 17 (2000) 207-221.

The graphite and/or the kaolin filler, as used in the compositions and articles hereof, are frequently incorporated into the heated solvent prior to transfer of the PAA polymer solution (or other solution for other types of monomers) as described above, so that the resulting polyimide is precipitated in the presence of the components (b) and/or (c), which thereby become incorporated into the composition.

In the compositions of this invention, the content of the various components includes all of the possible ranges that may be formed from the following amounts:

component (a), an aromatic polyimide, may be present in an amount of about 30 weight parts or more, about 33 weight parts or more, about 36 weight parts or more or about 39 weight parts or more, and yet in an amount of about 55 weight parts or less, about 52 weight parts or less, about 49 weight parts or less or about 46 weight parts or less;

component (b), a graphite, may be present in an amount of about 45 weight parts or more, about 48 weight parts or more, about 51 weight parts or more or about 54 weight parts or more, and yet in an amount of about 70 weight parts or less, about 67 weight parts or less, about 64 weight parts or less or about 61 weight parts or less; and component (c), a kaolin filler, may be present in an amount of about 0.1 weight parts or more, about 0.5 weight parts or more, about 1.0 weight parts or more, about 1.5 weight parts or more or about 2.0 weight parts or more, and yet in an amount of about 5.0 weight parts or less, about 4.5 weight parts or less, about 4.0 weight parts or less, about 3.5 weight parts or less or about 3.0 weight parts or less.

In a composition hereof, the amounts of the respective weight parts of the three components as combined together in any particular formulation, taken from the ranges as set forth above, will total to 100 weight parts.

The compositions of this invention include all of the formulations in which the compositional content may be expressed by any combination of the various maxima and minima, as set forth above, for any one component of the composition together with any such combination of maxima and minima for either or both of the other two components.

One or more additives may be used as an optional component "(d)" of a composition hereof. When used, additive(s) may be used in an amount in the range of about 5 to about 70 wt % based on the total weight of all four components together in a 4-component [(a)+(b)+(c)+(d)]composition, with the total weight of three components together in a 3-component [(a)+(b)+(c)] composition being in the range of about 30 to about 95 wt % based on the total weight of all four components together in a 4-component [(a)+(b)+(c)+(d)] composition.

Additives suitable for optional use in a composition hereof may include, without limitation, one or more of the following: pigments; antioxidants; materials to impart a lowered coefficient of thermal expansion, e.g. carbon fibers; materials to impart high strength properties e.g. glass fibers, ceramic fibers, boron fibers, glass beads, whiskers, graphite whiskers or diamond powders; materials to impart heat dissipation or heat resistance properties, e.g. aramid fibers, metal fibers, ceramic fibers, whiskers, silica, silicon carbide, silicon oxide, alumina, magnesium powder or titanium powder; materials to impart corona resistance, e.g. natural mica, synthetic mica or alumina; materials to impart electric conductivity, e.g. carbon black, silver powder, copper powder, aluminum powder or nickel powder; materials to further reduce wear or coefficient of friction, e.g. boron nitride or poly(tetrafluoroethylene) homopolymer and copolymers. Fillers may be added as dry powders to the final resin prior to parts fabrication.

Materials suitable for use in or to make a composition hereof may themselves be made by processes known in the art, or are available commercially from suppliers such as Alfa Aesar (Ward Hill, Mass.), City Chemical (West Haven, Conn.), Fisher Scientific (Fairlawn, New Jersey), Sigma-Aldrich (St. Louis, Mo.) or Stanford Materials (Aliso Viejo, Calif.).

As with products made from other infusible polymeric materials, parts fabricated from a composition hereof may be made by techniques involving the application of heat and pressure (see, for example, U.S. Pat. No. 4,360,626). Suitable conditions may include, for example, pressures in the range of from about from 50,000 to 100,000 psi (345 to 690 MPa) at ambient temperatures. Physical properties of articles molded from a composition hereof can be further improved by sintering, which may typically be performed at a temperature in the range of from about 300° C. to about 450° C.

Parts and other articles prepared from a composition hereof are useful as aircraft engine parts such as bushings, bearings, washers, seal rings, gaskets, wear pads and slide blocks. These parts may be used in all types of aircraft engines such as reciprocating piston engines and, particularly, jet engines. Parts and other articles prepared from a composition hereof are also useful in the following: automotive and other types of internal combustion engines; other vehicular subsystems such as exhaust gas recycle systems and clutch systems; pumps; non-aircraft jet engines; turbochargers; aircraft subsystems such as thrust reversers, nacelles, flaps systems and valves; materials processing equipment such as injection molding machines; material handling equipment such as conveyors, belt presses and tenter frames; and films, seals, washers, bearings, bushings, gaskets, wear pads, seal rings, slide blocks and push pins and other applications where low wear is desirable. In some applications, a part or other article prepared from a composition hereof is in contact with metal at least part of the time when the apparatus in which it resides is assembled and in normal use.

EXAMPLES

The advantageous attributes and effects of the compositions hereof may be seen in a series of examples (Examples 1~19), as described below. The embodiments of these compositions on which the examples are based are representative only, and the selection of those embodiments to illustrate the invention does not indicate that materials, components, reactants, ingredients, formulations or specifications not described in these examples are not suitable for practicing the inventions herein, or that subject matter not described in these examples is excluded from the scope of the appended claims and equivalents thereof. The significance of the examples is better understood by comparing the results obtained therefrom with the results obtained from certain trial runs that are designed to serve as controlled experiments (Controls A~F) and provide a basis for such comparison since the compositions therein do not contain all three of the components as described above.

In the examples, the following abbreviations are used: "BPDA" is defined as 3,3',4,4'-biphenyltetracarboxylic anhydride, "MPD" is defined as m-phenylenediamine, "PPD" is defined as p-phenylenediamine, "TOS" is defined as thermal oxidative stability, "avg" is defined as average or mean, "h" is defined as hour(s), "mL" is defined as milliliter(s), "m" is defined as meter, "cm" is defined as centimeter(s), "mm" is defined as millimeter(s), "in" is defined as inch, "g" is defined as gram(s), "kg" is defined as kilogram(s), "oz" is defined as ounce, "psia" is defined as pound per square inch (absolute), "rpm" is defined as revolutions per minute, and "wt %" is defined as weight percent (age).

Materials.

3,3',4,4'-biphenyltetracarboxylic anhydride was obtained from Mitsubishi Gas Chemical Co., Inc. (Tokyo, Japan). M-phenylenediamine and p-phenylenediamine were obtained from DuPont (Wilmington, Del., USA). The graphite used was a synthetic graphite, maximum 0.05% ash, with a median particle size of about 8 microns. Polyfilo DL kaolinite was purchased from J.M. Huber Corporation, (Atlanta, Ga., USA).

Methods.

Dried polyimide resin was fabricated into tensile bars by direct forming according to ASTM E8 (2006), "Standard Tension Test Specimen for Powdered Metal Products-Flat Unmachined Tensile Test Bar", at room temperature and 100,000 psi (690 MPa) forming pressure. The tensile bars were sintered at 405° C. for 3 hours with a nitrogen purge.

Thermal Oxidative Stability ("TOS") was tested by first weighing the tensile bars, then exposing two pieces of each tensile bar to a temperature of 800° F. (427° C.) for a period of 25 hours at a pressure of 88 psia (0.61 MPa) in air. A final weight measurement was then taken, and the percent weight loss of each piece of tensile bar was calculated according to the following formula:

$$\% \text{ weight loss} = \frac{\text{Initial Wt.} - \text{Wt. After}}{\text{Initial Wt.}} \times 100$$

and the percentage calculated and reported is percent weight loss. Percent weight loss for each of the two pieces was then averaged, and the average percent weight loss is reported.

High temperature wear on the tensile bars was measured at 800° F. (427° C.). In these tests, a steel ball bearing was rubbed against the surface of a test specimen under a 2 pound load for a 3 hour period. At the end of the experiment, the volume of the resulting wear scar on the test specimen ("Resin Wear") was measured. Resin Wear was measured by optical profilometry, from which the volume of the wear scar may be determined. The result for Resin Wear is reported as the volume of weight lost, stated in $in^3$ or $cm^3$. All measurements were made using the test procedures described in ASTM G 133-05 (2005), "Standard Test Method for Linearly Reciprocating Ball-on-Flat Sliding Wear", modified by using a temperature controlled oven, with acquisition of friction force data on a computer.

Examples 1~19

Controls A~F

These experiments were conducted to examine the effects of compositional content (relative amounts of polymer, graphite and kaolin filler) on the properties of parts molded from the compositions, including TOS and Resin Wear. Particles of polyimide resins based on 3,3',4,4'-biphenyltetracarboxylic dianhydride (BPDA), m-phenylene diamine (MPD) and p-phenylene diamine (PPD) containing varying amounts of graphite and a kaolin filler were prepared according to the method described in U.S. Pat. No. 5,886,129, which is by this reference incorporated in its entirety as a part hereof for all purposes. After drying, the resins were ground through a 20 mesh screen using a Wiley mill. Test specimen tensile bars were then prepared as described above.

An extreme vertices design of degree two was used to represent the content and performance relationship of various formulations having different compositional content of the three components: polyimide, graphite and sepiolite filler. The design space is summarized as follows, and is indicated by the heavy dashed line in FIGS. 1~3:

Polyimide 0.30 to 1.0 weight fraction
Graphite 0.00 to 0.70 weight fraction
Kaolinite 0.00 to 0.50 weight fraction Controls A, B, D and E represent the condition of 0.00 weight fraction kaolinite; and Controls C, D and F represent the condition of 0.00 weight fraction graphite. Control D thus also represents the condition of 1.0 weight fraction polyimide.

Content and TOS and Resin Wear results obtained for pieces molded from the compositions of Examples 1~19 and Controls A~F are shown below in Table 1:

TABLE 1

| Example or Control | Component Weight Fraction | | | TOS (percent) | Resin Wear | |
|---|---|---|---|---|---|---|
| | Polyimide | Graphite | Kaolinite | | ($10^{-8}$ $in^3$) | ($10^{-8}$ $cm^3$) |
| 1 | 0.300 | 0.660 | 0.040 | 2.68 | 1025 | 16800 |
| 2 | 0.500 | 0.470 | 0.030 | 2.57 | 820 | 13440 |
| A | 0.600 | 0.400 | 0.000 | 2.86 | 2050 | 33590 |
| 3 | 0.440 | 0.540 | 0.020 | 3.04 | 1230 | 20160 |
| 4 | 0.560 | 0.400 | 0.040 | 3.30 | 2460 | 40310 |
| 5 | 0.370 | 0.600 | 0.030 | 2.92 | 1025 | 16800 |
| 6 | 0.440 | 0.540 | 0.020 | 4.33 | 2255 | 36950 |
| 7 | 0.560 | 0.420 | 0.020 | 4.62 | 1230 | 20160 |
| 8 | 0.300 | 0.700 | 0.000 | 2.14 | 3000 | 49160 |
| 9 | 0.400 | 0.590 | 0.010 | 3.10 | 1380 | 22610 |
| 10 | 0.300 | 0.690 | 0.010 | 2.55 | 1250 | 20480 |
| B | 0.500 | 0.500 | 0.000 | 2.61 | 2390 | 39170 |
| 11 | 0.533 | 0.233 | 0.233 | 6.66 | 2255 | 36950 |
| C | 0.650 | 0.000 | 0.350 | 14.55 | 10660 | 174700 |
| 12 | 0.417 | 0.117 | 0.467 | 8.73 | 5535 | 90700 |
| 13 | 0.300 | 0.350 | 0.350 | 6.90 | 1400 | 22940 |
| D | 1.000 | 0.000 | 0.000 | 16.11 | 7100 | 116300 |
| 14 | 0.417 | 0.467 | 0.117 | 3.84 | 2665 | 43670 |
| 15 | 0.767 | 0.117 | 0.117 | 8.64 | 2665 | 43670 |
| E | 0.650 | 0.350 | 0.000 | 3.09 | 2870 | 47030 |
| 16 | 0.533 | 0.233 | 0.233 | 5.97 | 3075 | 50390 |
| 17 | 0.767 | 0.117 | 0.117 | 7.15 | 3280 | 53750 |
| 18 | 0.500 | 0.495 | 0.005 | 2.25 | 1640 | 26880 |
| 19 | 0.500 | 0.420 | 0.080 | 3.59 | 2870 | 47030 |
| F | 0.300 | 0.000 | 0.700 | 8.54 | 10450 | 164600 |

In FIG. 1, contour lines representing a range of average TOS values from 3% to 8% are overlaid on the diagram of the design space to produce a surface plot indicating the approximate compositional content of formulations that yield a particular average TOS in a molded part. From FIG. 1, it may be seen that, within the range of compositions studied, higher levels of graphite generally improve (i.e. lower) TOS somewhat, while higher levels of polyimide and kaolinite generally worsen (i.e. increase) TOS somewhat.

Figure 2:
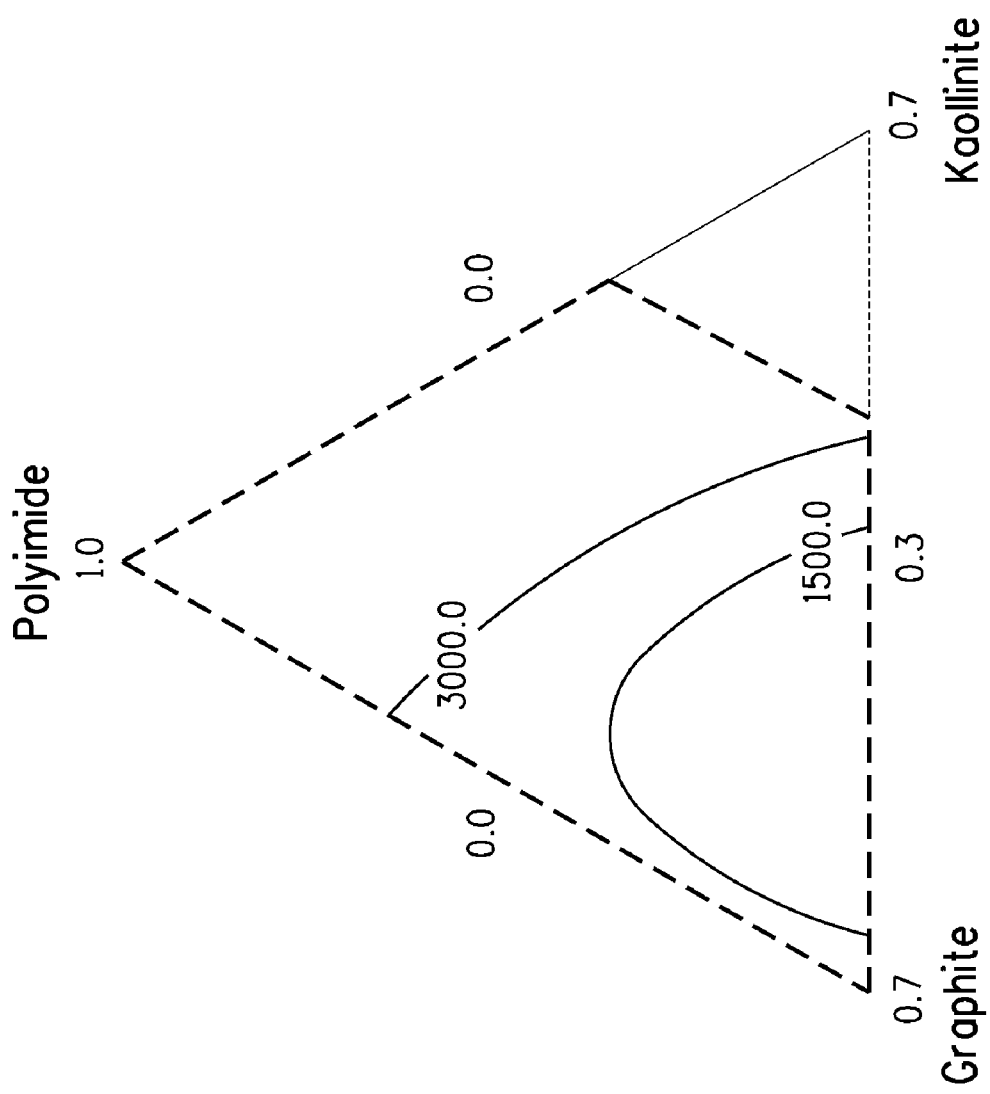
FIG. 2 is a response surface plot for the resin wear model derived in the examples.

In FIG. 2, contour lines representing a range of Resin Wear from 1500 to 3000×10$^{-8}$ in$^3$ (24580 to 49160×10$^{-3}$ cm$^3$) are overlaid on the diagram of the design space to produce a surface plot indicating the approximate compositional content of formulations that yield a particular amount of Resin Wear in a molded part.

Figure 3:
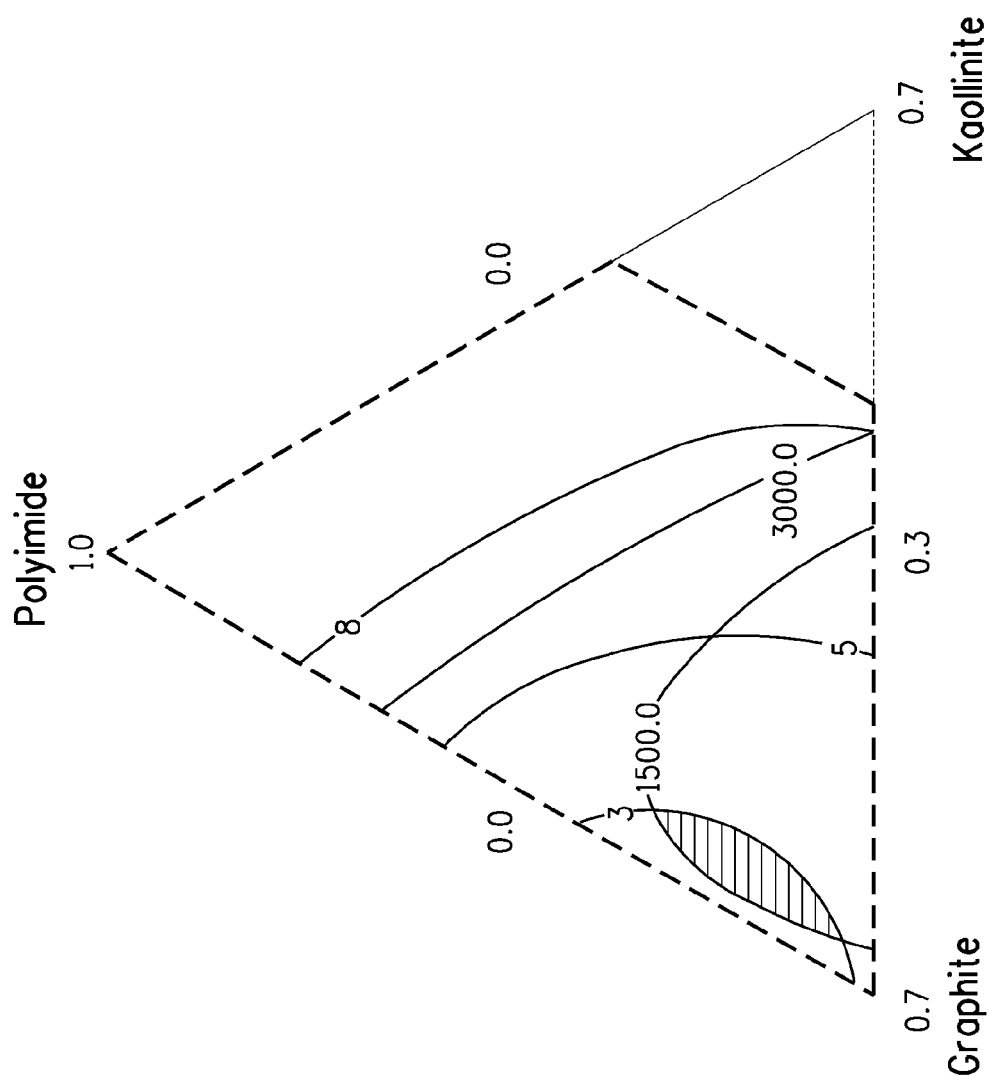
FIG. 3 is a superposition of the response surface plots for resin wear and for thermal oxidative stability as derived in the examples.

FIG. 3 is a superposition of the response surface plots for TOS from FIG. 1 and for Resin Wear from FIG. 2. The hatched area represents the region of intersection between the contour line representing a TOS of 3.0% or less, and the contour line representing a Resin Wear of 1500×10$^{-3}$ in$^3$ (24580×10$^{-3}$ cm$^3$) or less.

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

In this specification, unless explicitly stated otherwise or indicated to the contrary by the context of usage, (a) amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value;

(b) all numerical quantities of parts, percentage or ratio are given as parts, percentage or ratio by weight;

(c) use of the indefinite article "a" or "an" with respect to a statement or description of the presence of an element or feature of this invention, does not limit the presence of the element or feature to one in number; and (d) the words "include", "includes" and "including" are to be read and interpreted as if they were followed by the phrase "without limitation" if in fact that is not the case.

What is claimed is:

1. A composition comprising in admixture (a) an aromatic polyimide in an amount of about 30 weight parts to about 55 weight parts; (b) graphite in an amount of about 45 weight parts to about 70 weight parts; and (c) a kaolin filler in an amount of about 0.1 weight parts to about 5.0 weight parts; where all weight parts combined together total to 100 weight parts.

2. A composition according to claim 1 wherein the polyaimide is prepared from an aromatic tetracarboxylic acid compound or derivative thereof, wherein the aromatic tetracarboxylic acid compound is represented by the Formula (II):

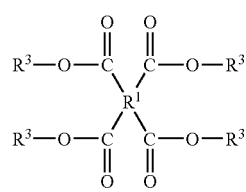

wherein R$^1$ is a tetravalent aromatic group, and each R$^3$ is independently hydrogen or a C$_1$~C$_{10}$ alkyl group, or mixtures thereof.

3. A composition according to claim 1 wherein the polyaimide is prepared from an aromatic tetracarboxylic acid compound selected from the group consisting of 3,3',4,4'-biphenyltetracarboxylic acid, 2,3,3',4'-biphenyltetracarboxylic acid, pyromellitic acid, and 3,3',4,4'-benzophenonetetracarboxylic acid, or derivative thereof, or mixtures thereof.

4. A composition according to claim 1 wherein the polyaimide is prepared from a diamine compound represented by the structure H$_2$N—R$^2$—NH$_2$, wherein R$^2$ is a divalent aromatic radical containing up to 16 carbon atoms and, optionally, containing in the aromatic ring one or more heteroatoms selected from the group consisting of —N—, —O—, and —S—.

5. A composition according to claim 1 wherein the polyaimide is prepared from a diamine compound selected from the group consisting of 2,6-diaminopyridine, 3,5-diaminopyridine, 1,2-diaminobenzene, 1,3-diaminobenzene, 1,4-diaminobenzene, 2,6-diaminotoluene, 2,4-diaminotoluene, benzidine and 3,3'-dimethylbenzidine.

6. A composition according to claim 1 wherein the polyimide comprises the recurring unit

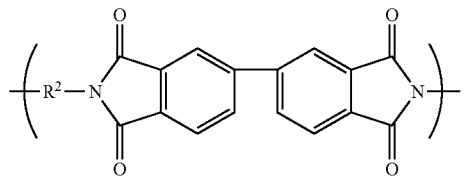

wherein $R^2$ is selected from the group consisting of p-phenylene radicals,

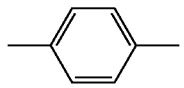

m-phenylene radicals,

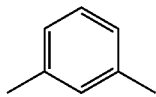

and a mixture thereof.

7. A composition according to claim 6 wherein greater than 60 to about 85 mol % of the $R^2$ groups comprise p-phenylene radicals, and about 15 to less than 40 mol % comprise m-phenylene radicals.

8. A composition according to claim 6 wherein about 70 mol % of the $R^2$ groups comprise p-phenylene radicals and about 30 mol % of the $R^2$ groups comprise m-phenylene radicals.

9. A composition according to claim 1 that comprises in admixture (a) an aromatic polyimide in an amount of about 33 weight parts to about 52 weight parts; (b) graphite in an amount of about 48 weight parts to about 67 weight parts; and (c) a kaolin filler in an amount of about 0.5 weight parts to about 5.0 weight parts; where all weight parts combined together total to 100 weight parts.

10. A composition according to claim 1 that comprises in admixture (a) an aromatic polyimide in an amount of about 36 weight parts to about 52 weight parts; (b) graphite in an amount of about 51 weight parts to about 64 weight parts; and (c) a kaolin filler in an amount of about 1.0 weight parts to about 5.0 weight parts; where all weight parts combined together total to 100 weight parts.

11. A composition according to claim 1 that comprises in admixture (a) an aromatic polyimide in an amount of about 39 weight parts to about 52 weight parts; (b) graphite in an amount of about 48 weight parts to about 64 weight parts; and (c) a kaolin filler in an amount of about 1.0 weight parts to about 5.0 weight parts; where all weight parts combined together total to 100 weight parts.

12. A composition according to claim 1 wherein a kaolin filler comprises kaolinite $[Al_2Si_2O_5(OH)_4]$.

13. A composition according to claim 1 further comprising as a component (d) one or more additives in an amount in the range of about 5 to about 70 wt % based on the weight of the total (a)+(b)+(c)+(d) composition, with the combined weight of the (a)+(b)+(c) components being together in the range of about 30 to about 95 wt % of the total composition.

14. A composition according to claim 13 wherein an additives comprises one or more members of the group consisting of pigments; antioxidants; materials to impart a lowered coefficient of thermal expansion; materials to impart high strength properties; materials to impart heat dissipation or heat resistance properties; materials to impart corona resistance; materials to impart electric conductivity; and materials to reduce wear or coefficient of friction.

15. An article fabricated from a composition according to claim 1.

16. An article according to claim 15 which comprises an internal combustion engine part.

17. An article according to claim 15 which comprises an aircraft part.

18. An article according to claim 15 which comprises an automotive part.

19. An article according to claim 15 which comprises a bushing, bearing, washer, seal ring, wear pad or slide block.

20. An article according to claim 15 which comprises a part for a gas recycle system; a clutch system; a pump; a turbocharger; a thrust reverser, a nacelle, a flaps system; an injection molding machine; a conveyor, belt press; and a tenter frame.

* * * * *